United States Patent Office 3,655,631
Patented Apr. 11, 1972

3,655,631
POLYMERISATION PROCESS
James R. Fraser, Luton, and Victor F. Jenkins, St. Albans, England, assignors to Laporte Industries Limited, London, England
No Drawing. Filed Nov. 17, 1969, Ser. No. 877,525
Claims priority, application Great Britain, Nov. 20, 1968, 55,163/68
Int. Cl. C08g 17/017
U.S. Cl. 260—78.3 R                13 Claims

ABSTRACT OF THE DISCLOSURE

Delta, epsilon, and zeta lactones are polymerized in the presence of strong organic acids such as halogen activated carboxylic acids or sulfonic acids as catalyst and compounds of the formula L—$CH_2OH$ as initiator wherein L contains ethylenic unsaturation activated by amide or ester linkages. The resulting terminally unsaturated polylactones are suitable for copolymerization with ethylenically unsaturated monomers.

---

This invention relates to a process for manufacturing polymeric compounds. In particular it relates to a process for the manufacture of a polyester and to processes for the manufacture of a polymer from such a polyester. The polyesters of the process of the present invention are of the type prepared by the polymerisation of a lactone, and, except where the context otherwise requires, the term "polyester" is used in this specification to mean such polyesters only.

It has been proposed to manufacture a polyester by the polymerisation of a lactone such as caprolactone using an active hydrogen atom compound as initiator, in the presence of a catalyst. The polyesters produced by such a lactone polymerisation reaction have a hydrolysis resistance superior to that of polyesters produced by the reaction of compounds having a plurality of alcoholic hydroxyl groups with compounds having a plurality of carboxylic groups. Catalysts that have been proposed for lactone polymerisation reactions include carboxylic acids, for example acetic and ethylhexanoic acids, salts of such carboxylic acids with metals other than metals of Groups Ia and IIa of the Periodic Table, for example stannous acetate and manganese acetate, and organometallic compounds, for example dibutyltin oxide and dibutyl titanate. When such catalysts are employed in the polymerisation reaction, the temperature of the reaction is normally at least 120° C., in order to achieve a reasonable rate of reaction.

In the process disclosed in U.S. application Ser. No. 715,078, filed Mar. 21, 1968 (now abandoned) lactones are reacted with an initiator compound in the presence of one or more acidic catalysts to provide in certain cases products that have improved film or bulk-physical characteristics and in other cases products that are converted by reaction with isocyanate compounds to polyurethane materials having improved physical characteristics. The acidic catalysts differ from the organic carboxylic acids previously used by (1) being organic acids that have a substantially higher value for their ionization constant or (2) being a solid organic or inorganic catalyst with or without the substantially higher ionization constant as compared with such previously used organic carboxylic acids.

The preferred catalysts described in said application Ser. No. 715,078 include halogenated actic acids and benzene sulphonic acids. The invention is not limited thereto, and any organic carboxylic or sulphonic acid having an ionisation constant at 25° C. expressed as a pK value of less than 3.0, and preferably less than 2.0, may be employed. Such acids are, in the specification of the present invention, referred to as "strong acids."

BACKGROUND OF THE INVENTION

It has been proposed to react polyesters having ethylenic unsaturation with a further monomer or monomers having ethylenic unsaturation in the presence of a catalyst or chain initiator to form an additional copolymer. It has not, however, proved easy to manufacture polyesters having ethylenic unsaturation by the polymerisation of a lactone, using, as initiator, an unsaturated compound having an active hydrogen atom because the high temperature hitherto used in the lactone polymerisation reaction have given rise to addition polymerisation of the ethylenically unsaturated bonds.

The polyesters having ethylenic unsaturation prepared hitherto have been generally prepared from a polyester formed by the polymerisation of a lactone with an alcohol as initiator. The polyester thus formed is terminated by at least one alcoholic hydroxyl group. The hydroxyl group can be reacted with an ester or ether-forming group on an unsaturated compound to produce a polyester having ethylenic unsaturation.

It is an object of the present invention to enable an unsaturated polyester to be produced that has one unsaturated group only per molecule.

It is an object of the present invention to enable an unsaturated polyester to be produced that is readily polymerised or copolymerised.

It is a further object of the present invention to produce an unsaturated polyester without substantial polymerisation of the unsaturated group.

Other and further objects of the invention will be evident to those skilled in the art from the following detailed description of the invention.

DETAILED DESCRIPTION

The process of the present invention comprises reacting a lactone, as hereinafter defined, with an initiator of the general formulae

L—$CH_2$—OH wherein L is an ethylenically unsaturated group including a linkage capable of activating the ethylenic unsaturation to addition polymerization, said linkage being selected from the group consisting of an ester linkage and an amide linkage, the total number of carbon atoms in the L group being less than 8.

In the general formulae of the initiator above, L is any group having ethylenic unsaturation in which the ethylenic unsaturation is activated to addition polymerisation whereby the initiator is capable of addition polymerisation in the absence of a catalyst at a temperature of below about 100° C.

By "lactone" we mean a compound of the formula

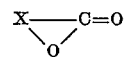

wherein X is a —$(CH_2)_n$— group wherein $n$ is an integer from 4 to 7 or wherein X is a —$(CR_2)_n$— group wherein $n$ is an integer from 4 to 7 and wherein each of the 8 to 14 groups R is any group selected from methyl, ethyl, n-propyl and isopropyl groups and hydrogen, chlorine and bromine atoms, provided that the total number of carbon atoms in the —$(CR_2)_n$— group does not exceed 12 and provided that there are no more than 2 halogen atoms in the —$(CR_2)_n$— group. Desirably $n$ is 5, i.e. the lactone is an epsilon-caprolactone, or a methyl epsilon-caprolactone, or a mixture of isomeric methyl-epsilon-caprolactones, or a mixture of isomeric methyl-epsilon-caprolactones with epsilon-caprolactone.

Other specific lactones that we prefer to use, although the preference is less than those mentioned above, are delta-valerolactones, and zeta-enanthalactones alone or as mixtures with each other or with one or more of the epsilon-caprolactones.

Kirk Othmer's Encyclopaedia of Chemical Technology, 2nd edition, volume 8, page 419 describes the reaction of various trichloro-compounds with unsaturated compounds. Trichloroacetic acid cannot therefore be used in the present invention.

The lactone polymerisation reaction desirably takes place at a temperature of below 60° C., and preferably below 50° C. There is no minimum temperature, but the lactone polymerisation reaction is usually too slow below about 35° C.

Preferred group L have the ethylenic unsaturation present in a $CH_2=C<$ group and most preferably in a $CH_2=CH-$ group. Such groups are particularly readily polymerised, and hence have been most sensitive to the high temperature hitherto required in lactone polymerisation reactions.

Groups which activate the ethylenic unsaturation to addition polymerisation include ester linkages, both carbonyloxy- and oxycarbonyl linkages and amide groups, halogen atoms, particularly chlorine atoms, nitrile groups, aldehyde and ketone groups in conjugation with the ethylenic unsaturation, and aromatic rings adjacent to the ethylenic unsaturation.

The group L may be any alkyl or aromatic group having the requisite properties stated above. Examples of initiators include.

the hydroxyethyl ester of acrylic acid, and the hydroxyethyl esters of derivatives of acrylic acid, for example methylacrylic acid. Other substances that may be used as initiators include hydroxyethyl esters of crotonic, glutaconic and angelic acids, the dihydroxyethyl esters of maleic and fumaric acids, N-methylol acrylamide and N-methylol methacrylamide. Hydroxyalkli derivatives of vinyl benzene and its homologues are also suitable as initiators, for example, vinylbenzyl alcohol.

The polyesters produced by the process of the invention have the general formulae

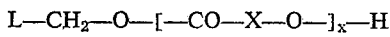

in which formulae $x$ is an integer, conveniently between 2 and 20, preferably between 6 and 14. It will however be understood that the product obtained from any reaction will be a mixture of such polyesters in which the values of $x$ will be different integers. Furthermore, mixtures of lactones will give polyesters which have different groups X in a single polyester molecule.

The hydroxy-terminated polyesters produced by the process of the invention may be acylated, if desired, in any suitable manner, to give a polyester that is not terminated by an active hydrogen group, having the general formulae

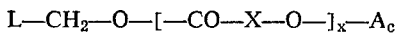

wherein Ac is the acyl group of the acid used to acylate the hydroxyl-terminated polyesters.

The unsaturated polyesters, both hydroxyl-terminated and acyl-terminated, may be used in addition polymerisation reactions to form addition copolymers with compounds having ethylenic unsaturation. For example, the unsaturated polyesters may be copolymerised with any of the following monomers: vinyl chloride, propylene, ethylene, styrene, acrylonitrile, acrylic acid and methacrylic acid and derivatives thereof, for example esters and amides, vinyl acetate, butadiene and divinyl benzene. The addition polymers so produced are particularly valuable as the polyester chains of the unsaturated polyester provide internal plasticisation, which cannot be removed by leaching out with water or other solvents or by evaporation. Conveniently between 2% by weight and 50% by weight of the unsaturated polyester of the present invention is used. Preferably, between 5% and 30% is used. Any method of polymerisation, in the presence of addition polymerisation initiators (free radical precursors) or otherwise, may be employed. In general, bulk polymerisation, solution polymerisation, emulsion polymerisation and suspension polymerisation may all be employed in suitable circumstances.

The addition copolymers prepared by the method of the present invention, as will be known to skilled polymer chemists, will require careful formulation for any particular application. In general, however, they may be cast, injection moulded, compression moulded, extruded, vacuum formed or heat formed according to their physical properties.

The invention is particularly described in the following examples. Example 1 describes the preparation of an unsaturated polyester and Examples 2, 3 and 4 describe the preparation of addition copolymers therefrom whilst Example 6 describes a paint formulation based on the copolymer produced in Example 4. Examples 7 and 8 describe the preparation of further unsaturated polyesters whilst Examples 5 and 9 describe the use as plasticisers of the unsaturated polyesters produced in Examples 1 and 7 respectively.

EXAMPLE 1

Epsilon-caprolactone was polymerised with hydroxylethylacrylate as initiator, in the presence of p-toluene sulphonic acid as catalyst. Epsilon-caprolactone (88 g.) was mixed with hydroxyethylacrylate (11.6 g.) and p-toluene sulphonic acid (0.1%) by weight was added. 2,5-di-t-butylquinone (0.1%) was added to prevent polymerisation of the double bond of the acrylate being catalysed by traces of peroxide in the epsilon caprolactone. The reaction was followed by measuring the refractive index of the solution and was complete after 4 hours at 45° C. The solid unsaturated polyester obtained had a molecular weight of about 960, as determined by the hydroxyl number method.

EXAMPLE 2

The product of Example 1 was copolymerised with styrene as follows: Unsaturated polyester (11 g.) was dissolved in styrene (6 g.) and to the solution cobalt naphthenate in styrene (1 g.) was added giving a cobalt concentration approximately 0.1%. Methyl ethyl ketone peroxide (0.1%) was added and the solution allowed to stand overnight at room temperature. A light brown rubber-like polymer was obtained.

EXAMPLE 3

The product from Example 1 was copolymerised with styrene as follows: polycaprolactone (10 g.) was dissolved in styrene (3 g.) and benzoyl peroxide (0.1%) was added. The mixture was heated for eight hours at 85° C. An off-white rubber-like copolymer is produced.

EXAMPLE 4

The product from Example 1 was copolymerised with vinyl acetate as follows:

The reactor was charged with vinyl acetate (56 g.) and water (66 g.). To this mixture an emulsifying agent (Moviol N70–88 (3.2 g.) sold by B.A.S.F.) was added along with potassium carbonate (0.3 g.) and glacial acetic acid (0.3 g.) to buffer the reaction mixture at pH 3.8–4.0. The polyester (18.4 g.) was dissolved in vinyl acetate (36 g.) and this solution was added to the reaction mixture over a period of 2 hours. Over the same period of time a solution of ammonium persulphate (0.36 g.) in water (3.0 g.) was added, this being the initiator for the polymerisation reaction. The reaction temperature was maintained at 70° C. throughout the course of the reaction and finally raised to 90° C. for 1 hour. An emulsion of 55% solids content was obtained.

EXAMPLE 5

The product from Example 1 was used as a plasticiser for PVC as follows:

Powdered polyvinyl chloride (9.8 g.) was mixed with the polyester (5.0 g.) and a dibutyltin dilaurate stabiliser (0.3 g.) was added. To initiate the polymerisation of the unsaturated polyester, tertiary butyl perbenzoate (0.15 g.) was added. The resulting mix was pressed at 5 t.s.i. for 10 minutes at a temperature of 165° C. A clear, slightly yellow sheet was obtained which was heated at 150° C. for 4 hours to complete the polymerisation process.

EXAMPLE 6

The product from Example 4 was compounded in a ball mill for 24 hours with the following formulation:

| | Parts (wt.) |
|---|---|
| TiO$_2$ pigment grade | 366 |
| Sodium pyrophosphate | 15 |
| Methyl cellulose | 73 |
| Water | 209 |
| Emulsion | 334 |

The paint has a fineness of grind as measured by a Hegmann gauge of 0.0005″.

An emulsion copolymer (solids content=51%) made from vinyl acetate and ethylhexyl acrylate was compounded in a similar way to that described before.

The following table summarizes the properties of the 2-paints.

| Property | Paint from vinyl acetate/ethylhexyl acrylate | Paint from vinyl acetate/polycaprolactone |
|---|---|---|
| Reflectance | 92.5 | 90.0 |
| Grid test | Grade 2 | Grade 2 |
| Water spotting | Slight | Slight |
| Sward rocker hardness, percent | 12.5 | 10.1 |
| Snatch test | Moderate | Good |

EXAMPLE 7

Epsilon-caprolactone was polymerised with N-methylol acrylamide in the presence of p-toluene sulphonic acid as catalyst.

Epsilon-caprolactone (46 g.) was mixed with N-methylol acrylamide (5.1 g.) and p-toluene sulphonic acid (0.5%) was added. The reaction was followed by measurement of the refractive index of the polymerisation mix and was complete after 4 hours at 45° C. The unsaturated polyester obtained had a molecular weight=945 as determined by the iodine number method, and a refractive index of 1.4665 at 60° C.

EXAMPLE 8

Epsilon-caprolactone was polymerised with hydroxyethyl methacrylate using -p-toluene sulphonic acid as catalyst.

Epsilon-caprolactone (74 g.) was mixed with hydroxyethyl methacrylate (26 g.) and p-toluene sulphonic acid (0.1%) was added. 2,5 di-t-butylquinone (0.05 g.) was added to prevent polymerisation of the double bond of the methyacrylate group. The polymerisation was followed by measuring the refractive index and was complete in 4½ hours at 45° C. The molecular weight of the unsaturated polyester obtained was 437 by the hydroxyl number method and 430 by the iodine number method. The polyester was a slightly yellow, viscous liquid, having a refractive index of 1.4570 at 60° C.

EXAMPLE 9

The product from Example 7 was used as a plasticiser for PVC as follows:

Powdered polyvinyl chloride (6.9 g.) was mixed with the unsaturated polyester (3.0 g.), and dibutyltin dilaurate stabiliser (0.2 g.) was added. To this mixture was added t-butyl perbenzoate (0.3 g.) as initiator. The mix was then pressed at 5 t.s.i. for 10 minutes at a temperature of 160° C. A clear, yellow-brown sheet was obtained which was heated at 150° C. for 4 hours.

What is claimed is:

1. A process for the production of a polymerizable polyester comprising polymerizing,
   at a temperature below about 100° C.,
   at least one lactone,
   with an organic initiator,
   in the presence of an organic acid catalyst wherein:
   said organic acid catalyst is a carboxylic acid or a sulphonic acid, having a pK value of 25° C. in water of less than 3 and selected from the group consisting of halogen substituted aliphatic carboxylic acids other than trichloracetic acid, alkane sulphonic acids, benzene sulphonic acid and lower alkyl substituted benzene sulphonic acids;
   said lactone is selected from delta valerolactones, epsilon caprolactones and zeta enanthalactones; and
   said initiator has the formula:

$$L—CH_2—OH$$

whereis L is as ethylenically unsaturated group including a linkage capable of activating the ethylenic unsaturation to addition polymerization, said linkage being selected from the group consisting of an ester linkage and an amide linkage, the total number of carbon atoms in the L group being less than 8.

2. A process according to claim 1 wherein said initiator is selected from the group consisting or hydroxyethyl acrylate, hydroxyethyl methacrylate, hydroxyethyl crotonate, hydroxyethyl glutaconate, hydroxyethyl angelate, dihydroxyethyl fumarate, dihydroxyethyl maleate, N-methylol acrylamide and N-methylol methacrylamide.

3. A process as claimed in claim 1 wherein the lactone is at least one lactone selected from epsilon-caprolactone and methyl-epsilon-caprolactone.

4. A process as claimed in claim 3 wherein said organic initiator is capable of addition polymerization in the absence of a catalyst at a temperature of below about 100° C.

5. A process as claimed in claim 1 wherein the organic initiator is a hydroxyalkyl ester of acrylic acid or methacrylic acid.

6. A process as claimed in claim 5 wherein the organic initiator is β-hydroxyethyl acrylate.

7. A process as claimed in claim 5 wherein the organic initiator is β-hydroxyethyl methacrylate.

8. A process as claimed in claim 4 wherein the organic initiator is an alkyl substituted or unsubstituted N-(hydroxyalkyl) acrylamide.

9. A process as claimed in claim 1 wherein the initiator is N-methylol-acrylamide or N-methylolmethacrylamide.

10. A process as claimed in claim 1 wherein the organic carboxylic acid is a halogenated acetic acid other than trichloroacetic acid.

11. A process as claimed in claim 10 wherein the organic initiator is a compound selected from alkyl substituted or unsubstituted hydroxyalkyl acrylates or alkyl substituted or unsubstituted N-(hydroxyalkyl) acrylamide.

12. A process as claimed in claim 1 wherein the organic sulphonic acid is a benzene sulphonic acid or an alkyl substituted derivative thereof.

13. A process as claimed in claim 12 wherein the organic initiator is a compound selected from alkyl substituted or unsubstituted hydroxyalkyl acrylates or substituted or alkyl unsubstituted N-(hydroxyalkyl) acrylamide.

References Cited

UNITED STATES PATENTS

| | | | |
|---|---|---|---|
| 2,452,092 | 10/1948 | Ault et al. | 260—399 |
| 2,487,885 | 11/1949 | Magoffin et al. | 260—63 |
| 3,169,945 | 2/1965 | Hostettler et al. | 260—78.3 |
| 3,284,417 | 11/1966 | Hostettler et al. | 260—78.3 |
| 3,523,921 | 8/1970 | Schultz | 260—37 |

OTHER REFERENCES

Chemical Abstracts 70, 107004(b), (1969).

WILLIAM H. SHORT, Primary Examiner

E. A. NIELSEN, Assistant Examiner

U.S. Cl. X.R.

260—874